United States Patent [19]

Klees

[11] Patent Number: 4,694,342
[45] Date of Patent: Sep. 15, 1987

[54] SPATIAL FILTER USEFUL FOR REMOVING NOISE FROM VIDEO IMAGES AND FOR PRESERVING DETAIL THEREIN

[75] Inventor: Kevin J. Klees, Rochester, N.Y.

[73] Assignee: Eastman Kodak Company, Rochester, N.Y.

[21] Appl. No.: 858,337

[22] Filed: May 1, 1986

[51] Int. Cl.[4] .................... H04N 5/21; H04N 1/40
[52] U.S. Cl. .................................. 358/167; 358/166; 358/284; 382/54
[58] Field of Search ................ 358/166, 167, 284; 382/52, 54

[56] References Cited

U.S. PATENT DOCUMENTS

| | | | |
|---|---|---|---|
| 4,058,836 | 11/1977 | Drewery et al. | 358/167 |
| 4,231,065 | 10/1980 | Fitch et al. | 358/166 |
| 4,337,518 | 6/1982 | Ohnishi et al. | 364/724 |
| 4,446,484 | 5/1984 | Powell | 358/166 |
| 4,541,116 | 9/1985 | Lougheed | 382/54 |
| 4,573,070 | 2/1986 | Cooper | 358/167 |

Primary Examiner—Howard W. Britton
Assistant Examiner—John K. Peng
Attorney, Agent, or Firm—Dennis R. Arndt

[57] ABSTRACT

Apparatus for a spatial filter that can function both recursively and non-recursively for removing noise from video images while substantially preserving fine detail, and a method for use therein are disclosed. Specifically, a look up table stores pre-defined filtered output pel values and pre-defined feedback pel values. This table is accessed by an address formed of the values of pels that constitute a pel mask for a current input pel. The pel mask contains pels from the incoming image as well as the current and past values of the feedback pel produced from the look up table. Each time the table is successively accessed, a filtered output pel value and a feedback pel value are generated. As long as the value of the feedback pel equals that of a corresponding pel in the incoming image, the filter operates non-recursively; when these pel values are different, recursive operation occurs instead. Consequently, portions of the incoming image can be filtered non-recursively to substantially preserve image detail therein while other portions of the same image can be filtered recursively to remove image noise therefrom.

14 Claims, 11 Drawing Figures

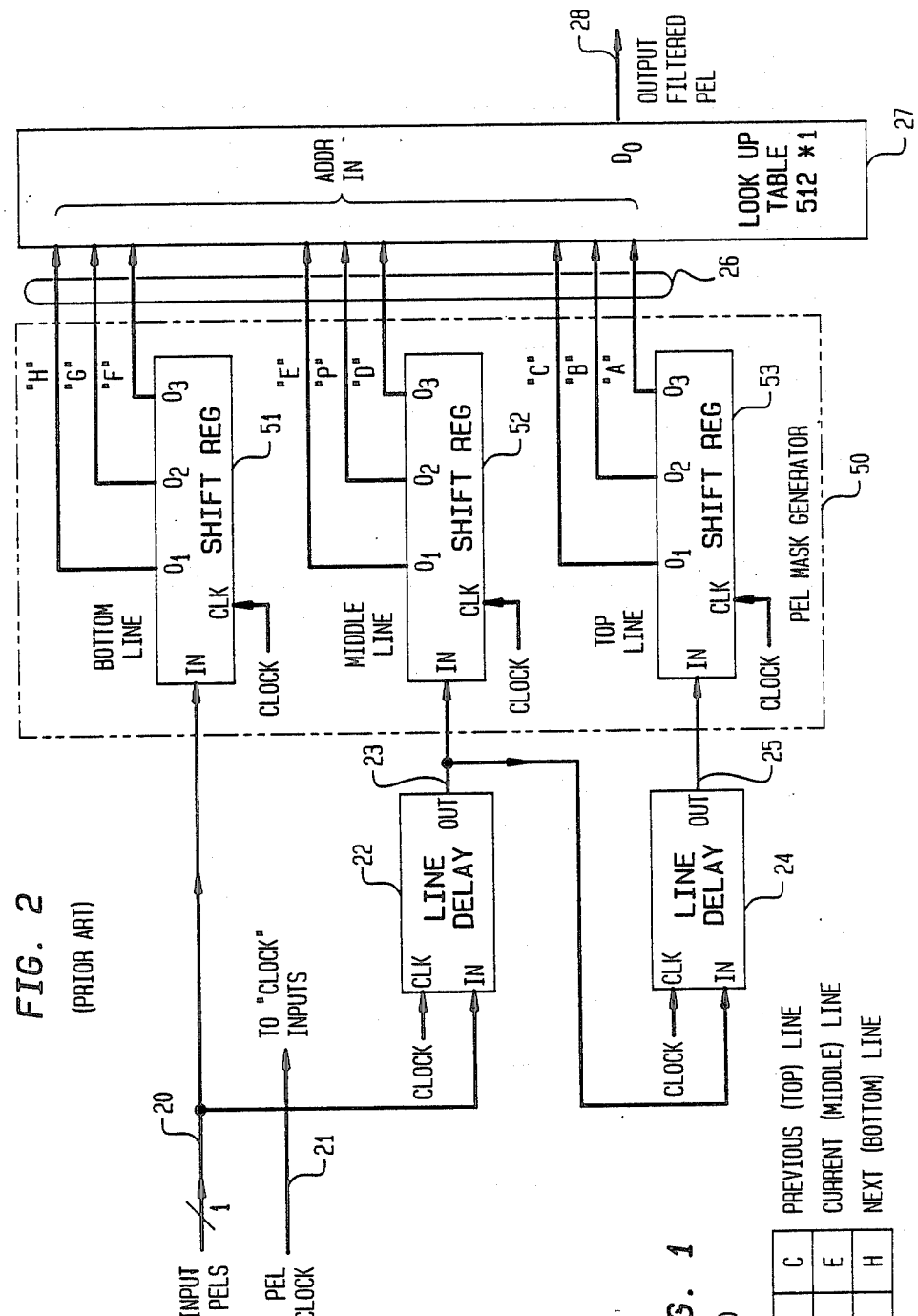

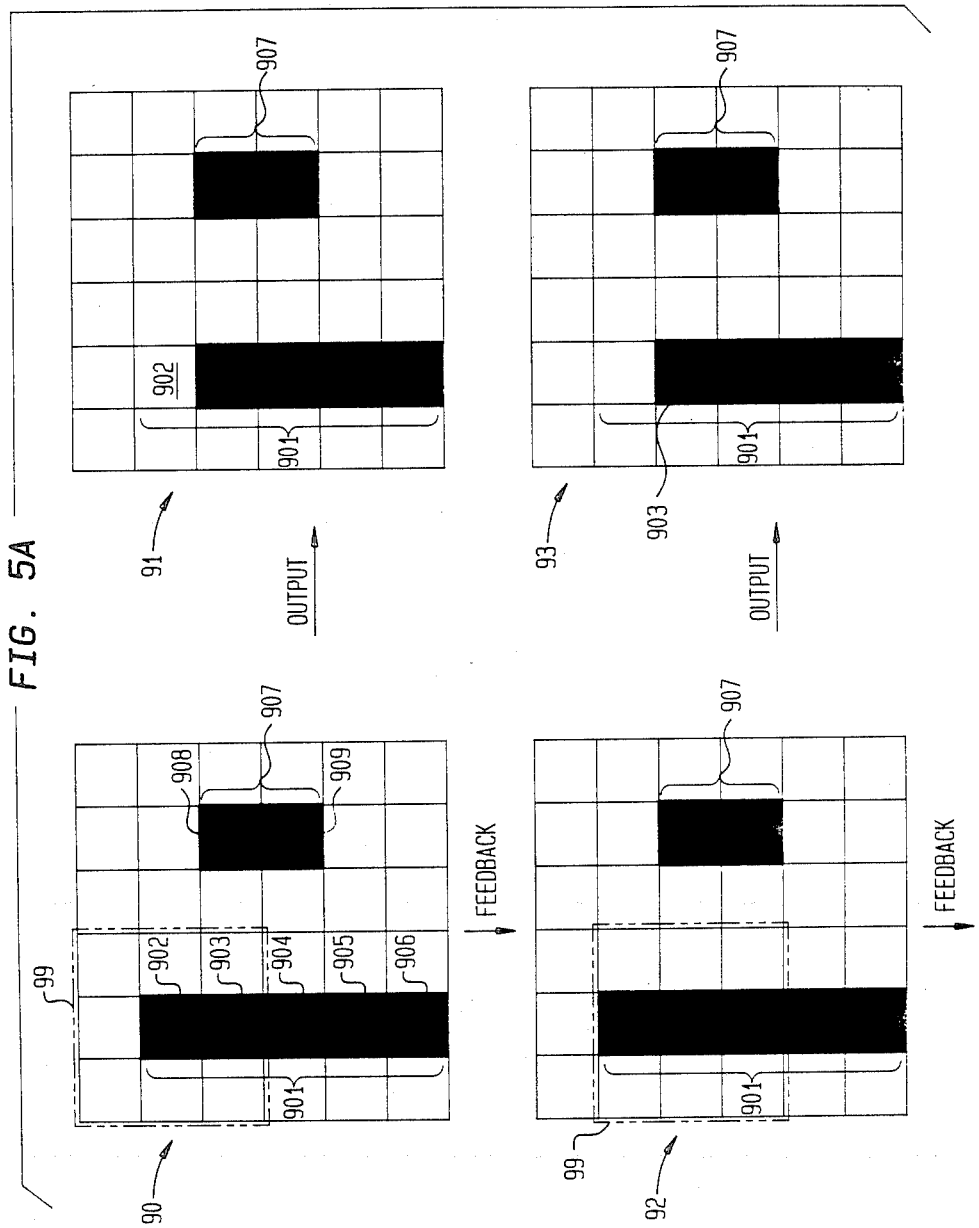

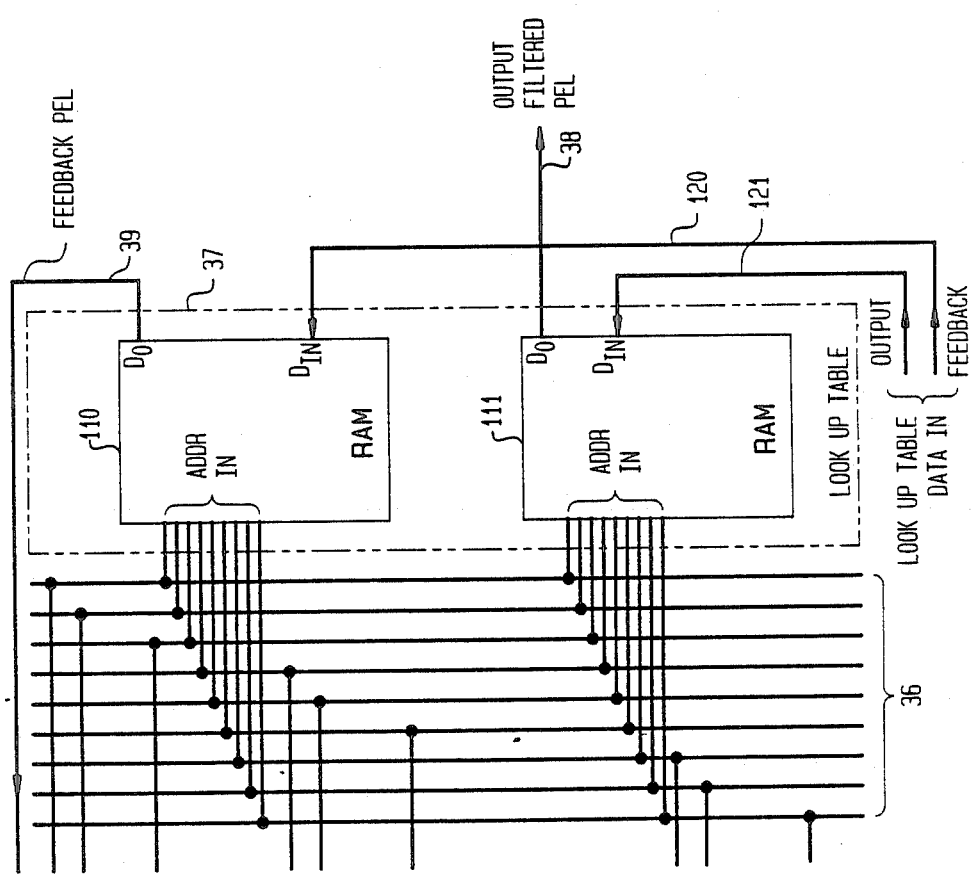

SPATIAL FILTER USEFUL FOR REMOVING NOISE FROM VIDEO IMAGES AND FOR PRESERVING DETAIL THEREIN

BACKGROUND OF THE INVENTION

1. Field of the Invention

The invention relates to apparatus for a spatial filter, specifically one that can function both recursively and non-recursively, for removing noise from video images and for preserving detail in those images, and to a method for use therein.

2. Description of the Prior Art

Currently, systems that digitally process an analog video image are becoming increasingly common. These systems illustratively include facsimile systems, systems for scanning paper documents and/or microfilm into machine readable form, and electronic reproduction, e.g. xerographic, systems. All these systems accept an analog image, typically an image appearing on, for example, a piece of paper and then transform that image into a so-called frame of digital information. Thereafter, the frame is digitally processed, often to remove extraneous noise and/or to perform rudimentary image enhancement. The results of this processing may be converted back into analog form for eventual display at, for example, a remote facsimile receiver, or alternatively remain in digital form as input to a computer for further processing, such as to provide sophisticated image enhancement for locating fine pre-defined detail in the image.

A frame of digital video information used in these systems contains a matrix of small discrete picture elements, i.e. so-called pels or pixels. Each pel has a value assigned to it. For black and white (bi-level) images, often the value of each pel is binary "0" for black or binary "1" for white.

Unfortunately, whenever an image is scanned, noise frequently appears in the resulting frame. For bi-level images having a white background—typically that occurring in textual images, a pol in a scanned image might appear black when the same corresponding pel in the original image is white. This black pel is so called noise pel. Noise pels can result from various sources: from the scanning equipment itself or from the media that holds the original image. Specifically, the media that stores the original image may itself have certain characteristics that produce unwanted noise pels. For example, in microfilm systems that employ a very high reduction ratio, the size of each grain used in the microfilm itself is often comparable to the size of the detail in the image that is being recorded on that film. Hence, when light is projected through the microfilm, a grain on the film may cause an unwanted darkened area to appear in a projected image. This noise is often referred to as "film noise". If the grain is sufficiently large, film noise will cause a noise pel to appear in the scanned image. A similar phenomena, i.e. so-called "paper noise", occurs for images that exist on paper. Specifically, a sheet of paper often contains small surface irregularities. These irregularities reflect light differently and, as such, might cause spots to appear on an image that has been reflected from the paper into the scanner, or, in the case of reproduction system, onto a photo conductive drum or belt. These spots, in turn, cause noise pels to appear in the scanned image.

No matter how noise pels arise, they are unwanted and must be removed from a scanned image in order for it to accurately depict an original image.

One well-known technique for removing noise pels is to pass the entire image frame through a spatial filter. Generally speaking, spatial filters operate on a square array (matrix) of pels, typically 3 by 3 pels and larger, and produce a filtered value for the current pel which is located at the center of the array. The pels above the center pel are from the previous scan line; while those below the center pel from a portion of the following scan line. Two techniques have been taught in the art for removing noise pels: filtering the noise pels from the scanned image through use of high, low and/or band pass spatial filters—(the "filtering" technique), or detecting pre-defined patterns of pels in the array and setting the center pel in the array to a specific value in accordance with these patterns (the "logical smoothing" technique).

For example, in the filtering technique, a pre-defined weighting factor is assigned to each pel in the array. The values of all these factors determine the specific characteristics of the filter and are set to match a desired feature of interest in the image. In particular, the pel weightings can be chosen to implement a high pass spatial filter for extracting small scale fluctuations from the image—i.e. fine detail, and/or to implement a low pass spatial filter for detecting large scale fluctuations in the image—i.e. relatively large movements or brightness variations occurring over a relatively large area in the image. Once the value of all the weighting factors have been chosen, each pel in the array is multiplied by a corresponding factor. Thereafter, all the weighted pels in the array are summed together to generate the resulting pel. Noise pels can be removed by processing the array of pels through successive high and low pass spatial filters. U.S. Pat. No. 4,446,484 (issued to P. G. Powell on May 1, 1984) describes one such arrangement for a spatial filter which incorporates high, low and band pass spatial filters. Although arrangements such as this which rely on the filtering technique can generate satisfactory performance, the circuitry needed to implement any of these arrangements, for example that shown in the U.S. Pat. No. 4,446,484 tends to be quite complex.

To reduce circuit complexity and cost, various filters utilizing the above-described logical smoothing technique have been proposed. For example, see D. Ting et al "Digital Processing Techniques for Encoding of Graphics", *Proceedings of the IEEE*, Vol. 68, No. 7, July 1980, pages 757–769 (hereinafter referred to as "Ting"). Specifically, Ting teaches, on page 764, that a neighborhood, typically a 3 by 3 window of pels (also referred to as a pel mask), which surrounds a particular pel is defined and the value of the particular pel (the center or output pel) is determined by the presence or absence of a specific configuration of black or white pels in the window. Simple logical smoothing entails determining the value of the center pel in the window to be the "exclusive or" of the values of its eight neighboring pels. With this technique isolated black and white noise pels can be removed from an image. Hence, an isolated black pel can be selectively changed to white and vice versa where necessary to remove noise and enhance image quality. Logical smoothing is not only simpler to implement than the filtering technique described above but also possesses the additional advantage that the output pel is pre-defined for certain patterns of pels existing within the window. Unfortunately, simple logical smoothing produces rounded corners within the image that, for example, cause exaggerated serifs to appear on textual characters. A variation of logical smoothing is majority logic smoothing. Here, the value of a pel is determined by the value of a majority of pels around it. For example, a pel is set to black if more than half of its surrounding pels are black. Unfortunately, majority logic smoothing not only produces excessively smoothed characters but also tends to cause a loss of connectivity on thin lines present within the scanned image. To remedy this loss, an additional check is incorporated into majority logic smoothing and utilized before the center pel is set. This check entails storing additional patterns of pels. Each pattern resembles one possible thin contour of pels that can occur in the image. In this manner, the center pel is determined by majority logic smoothing except in those circumstances where a contour is detected and, in those instances, the contour dictates the color of the center pel. Unfortunately, in practice, majority logical smoothing with contour checking has produced images with thickened image detail. For example, see M. G. B. Ismail et al, "New Preprocessing Technique for Digital Facsimile Transmission" *Electronics Letters*, May 1980, Vol. 16, No. 10, pages 355-356.

The logical spatial filters thusfar described are non-recursive. For these filters, the color of an output pel only depends upon the original color of every pel existing within each pel mask. Specifically, regardless of whether the color of any pel was changed or not, only the original color of that pel, e.g. black, is used in the pel mask for the next successive output pel. Non-recursive filters generally posses a fairly "weak" filter characteristic and thus unfortunately do not completely remove noise pels from an image.

In an attempt to improve the performance of logical smoothing type spatial filters, the art has taught that these filters could be implemented as recursive. For a recursive filter, the color of an output pels. Specifically, if the upon values of previously changed pels. Specifically, if the color of a pel was changed from, for example, black to white, then the new color, white, of this pel is used in the pel mask for the next successive output pel. Recursive filters have a "strong" filtering characteristic and hence effectively remove noise pels from an image. Unfortunately, these filters disadvantageously remove fine detail from the image.

Therefore, a need exists in the art for a logical smoothing type spatial filter which can remove noise pels from a video image and, when necessary, also preserve fine detail.

SUMMARY OF THE INVENTION

Accordingly, an object of the present invention is to provide apparatus for a logical smoothing type spatial filter which removes noise pels from an image, illustratively a bi-level image.

A particular object is to provide such a spatial filter which can remove noise pels and, when necessary, preserve fine detail in the image.

Another particular object is to provide such a spatial filter that relatively simple to implement.

These and other objects are accomplished in accordance with the teachings of the present invention by a spatial filter which utilizes a noise determination circuit to determine whether an input pel is a noise pel or an image pel. For the values of all the pels that currently form the pel mask, this circuit, preferably a look up table, produces a filtered output pel value and a corresponding feedback pel value. This table is accessed by an address formed of the values of pels that constitute the current pel mask. The pel mask contains pels from the incoming image as well as the current and past values of the feedback pel produced from the look up table. Each time the table is successively accessed, another filtered output pel value and a corresponding feedback pel value are generated.

As long as the value of the feedback pel equals that of a corresponding pel in the incoming image, the filter operates non-recursively; when these pel values are different, recursive operation occurs instead. In particular, during recursive operation, the pel mask used in the inventive filter utilizes present and past feedback pel values for various pel values in the mask. As a result of the recursive operation, the inventive spatial filter is strongly sensitive to groupings of two contiguous noise pels and effectively removes this noise from the incoming image. During non-recursive operation the pel mask is solely composed of pels that exist in the original image. Non-recursive operation is weakly sensitive to noise and is used to substantially preserve fine detail in the incoming image. The value of the feedback and output pels are both defined based upon expected pel patterns that are to comprise detail or noise in the image. By virtue of the value of the feedback pel, portions of the incoming image can be filtered non-recursively to substantially preserve image detail therein while other portions of the same image can be filtered recursively to remove image noise therefrom.

BRIEF DESCRIPTION OF THE DRAWING

The teachings of the present invention can be readily understood by considering the following detailed description in conjunction with the accompanying drawing, in which:

FIG. 1 depicts a typical 3 by 3 pel mask;

FIG. 2 is a block diagram of a spatial filter known to the art;

FIG. 5 shows the proper alignment of the drawing sheets for FIGS. 5a-5b;

FIGS. 5a and 5b collectively depict output and feedback pels produced at various steps in an illustrative image as the inventive spatial filter shown in FIG. 3 progressively moves through this image;

FIGS. 6a-6c collectively depict a detailed block diagram of the inventive spatial filter shown in FIG. 3.

To facilitate easy understanding, identical reference numerals have been used to denote identical elements common to the figures.

DETAILED DESCRIPTION

Figure 3:
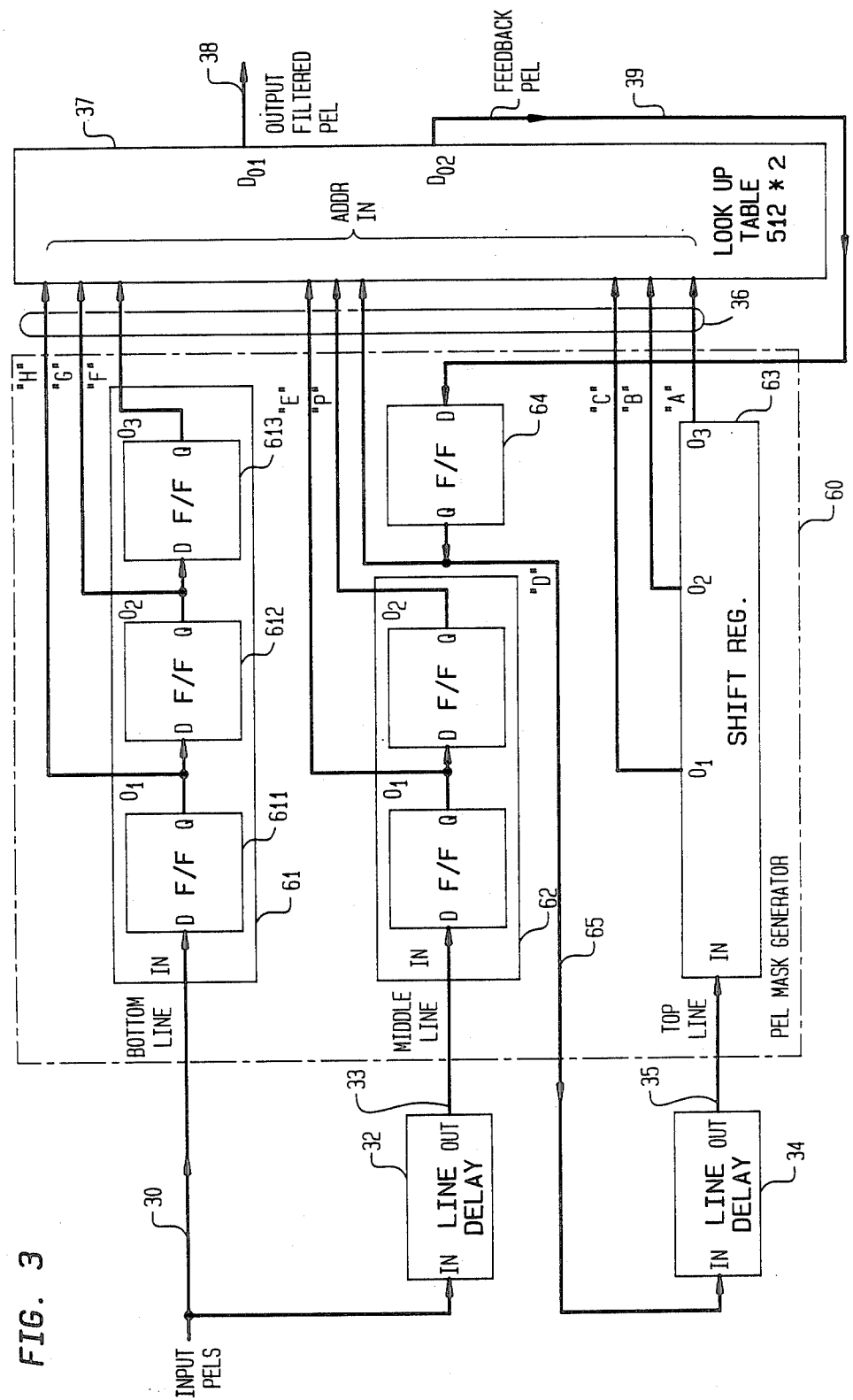
FIG. 3 depicts a block diagram of a preferred embodiment of a spatial filter constructed in accordance with the teachings of the present invention.

All spatial filters used for image enhancement and/or noise removal provide a value for a particular pel in an image, hereinafter referred to as pel P. To do so, the spatial filter operates on both pel P and also on the pels that surround pel P. The entire group of input pels that are used to define the value of a current pel are commonly referred to as a pel mask. A 3 by 3 pel mask is commonly used in spatial filters. FIG. 1 shows such a mask. A spatial filter operating on the 3 by 3 mask shown in FIG. 1 provides a value for pel P given as input the values of nine pels; pels A, B and C which occur in the previous (or top) scan line; pels D, P and E which occur in the current (or middle) scan line; and pels F, G and H which occur in the next (or bottom) scan line. For widest applicability, the inventive system will be discussed for use in conjunction with a 3 by 3 pel mask, specifically that shown in FIG. 1. Nonetheless, those skilled in the art will clearly recognize that the inventive filter can be easily expanded to operate with pel masks of other sizes and, after reading the following description, will understand how to expand the system accordingly.

A full understanding of the inventive spatial filter can best be obtained by first considering a spatial filter known to the art and then focusing on the differences between the prior art spatial filter and the inventive spatial filter.

FIG. 2 shows a block diagram of a logical smoothing type spatial filter known to the art. This filter uses the values of all nine pels situated within a 3 by 3 pel mask as an address to access a look up table. The look up table stores the appropriate filtered output value of center pel P for each possible combination of the values of all nine pels occurring in the mask and provides that value as the filter output.

Specifically, this prior art spatial filter contains pel mask generator 50, line delays 22 and 24 and look up table 27. Input pels are routed over lead 20 to shift register 51 located within pel mask generator 50. This shift register stores the three pels that form the bottom line of the pel mask (pels F, G and H shown in FIG. 1). To simultaneously form the middle line in the pel mask (pels D, P and E shown in FIG. 1), the input pels are routed through line delay 22 which provides a delay of one scan line. The resulting delayed pels are applied, via lead 23, as input to shift register 52. As a result, while the pels in the bottom line are being shifted into register 51, three pels in the same corresponding positions in the middle scan line are being simultaneously shifted into register 52. The top line in the pel mask (pels A, B and C shown in FIG. 1) are similarly formed by further delaying the input pels by one additional scan line and applying the resulting pels as input to shift register 53. This additional delay of one scan line is provided by routing the pels provided at the output of line delay 22 through line delay 24. The pels produced by line delay 24 are applied, via lead 25, as input to shift register 53. Both line delays and the three shift registers are all synchronously clocked at the occurrence of each input pel by the application of a suitable clock pulse applied to pel clock lead 21. The outputs of all three shift registers are applied in parallel, via leads 26, as an address input to look up table 27, typically a read only memory (ROM) of appropriate size. The location of the particular pel in the pel mask and carried by each address lead is shown in quotes. Each location in this table stores a pre-defined filtered value for the pel, P, located in the center of pel mask 10 given a unique combination of the values of all nine pels in the mask. Inasmuch as the values of all nine pels when taken together can produce 512 different combinations, this look up table has 512 separately addressable locations. The output pel produced by look up table 27 is applied to lead 28 as the output filtered value for pel P.

FIG. 3 shows a block diagram of a logical smoothing spatial filter constructed in accordance with the teachings of the present invention. As shown, the inventive filter contains pel mask generator 60, look up table 37, and line delays 32 and 34. However, the inventive filter, in contrast to that of the prior art, is capable of operating either as a non-recursive or as a recursive filter. Recursive operation advantageously increases the sensitivity of the filter to noise pels while non-recursive operation preserves fine detail. Consequently, the inventive filter is more sensitive to noise pels than prior art non-recursive filters and can filter noise that extends over more than one pel in an area of the image while substantially preserving fine detail in another area of the same image. The reader is directed to the following U.S. patents for background information on recursive operation: U.S. Pat. Nos. 4,337,518 (issued to M. Ohnishi et al on June 29, 1982), 4,231,065 (issued to R. C. Fitch et al on Oct. 28, 1980) and 4,058,836 (issued to J. O. Drewery on Nov. 15, 1977).

Specifically, as shown in FIG. 3, look up table 37 provides two output bits: an output filtered pel on lead 38 and a feedback pel on lead 39. This feedback pel, in lieu of one of the input pels, specifically input pel "D" as shown in FIG. 1, is stored within the pel mask, particularly within flip/flop 64—as will be discussed in detail shortly. The value of this feedback pel is then recursively used as one of the address bits to access the look up table. In addition, the feedback pels are also applied as input to line delay 34 to generate the top line of pels in the pel mask. The contents of the look up table, both the output filtered pel and the recursive feedback pel, are empirically determined from pre-defined features of the images that will be processed by the filter and are subsequently varied slightly ("fine-tuned") by suitable experimentation. This look up table can be implemented using programmable array logic (PAL).

The bottom line of the pel mask is formed in the same manner as shown in FIG. 2. Specifically, input pels are successively shifted into shift register 61. This shift register contains three D type clocked flip/flops 611, 612 and 613. The outputs from these flip/flop are applied in parallel, via leads 36, to respective address inputs of look up table 37.

To form the middle line of the pel mask, input pels are applied to line delay 32 which delays these pels by one scan line. The output of this line delay is applied as input to two bit shift register 62 which itself contains two clocked D type flip/flops. This register provides the values of input pels "E" and "P" as two address bits to look up table 37. The remaining pel, i.e. pel "D", that forms part of the middle line is provided as the feedback pel from look up table 37. As discussed in detail below, the value of the feedback pel is pre-defined and accessed using the values of all nine pels that constituted the immediately preceding pel mask stored within pel mask generator 60.

The top line of the pel mask is formed from past values of feedback pels. Specifically, each successive feedback pel stored within flip/flop 64 is routed to the input of line delay 34, via lead 65. The pels appearing at the output of this line delay are applied, via lead 35, as input to three bit shift register 63, which contains the same circuitry as shift register 61. All the flip/flops and line delays shown in FIG. 3 are clocked, in an identical fashion to that shown in FIG. 2, from a common source of pel clock pulses. To simplify the drawing, all these clock leads have been omitted from FIG. 3. These clock leads can be easily added by those skilled in the art.

The recursive nature of the inventive spatial filter can best be explained by considering the pel masks associated with two adjacent pels (e.g. pels n and n+1) situated on a current scan line. In particular, as scanning proceeds along the scan line, each pel has a pel mask centered about it. Once the values of all the pels that form the pel mask centered about pel n have been applied as address inputs to look up table 37, the corresponding addressed location in that table is accessed. Two pels are then produced by the table: the output filtered value, via lead 38, for pel n and the feedback pel on lead 39. The feedback pel is applied to the data input of flip/flop 64 as pel "D" of the pel mask for the next successive input pel. At the instant the next successive input pel is applied to the spatial filter and clocked in by a suitable pel clock pulse (not shown), the feedback pel along with the remaining eight pels in the pel mask, now with pel n+1 being the central pel in the pel mask, are all simultaneously clocked into the flip/flops contained within pel mask generator 60. The values of all these pels are then used to access the look up table to determine both the output filtered value for pel n+1 and the appropriate feedback pel. This process is repeated for each successive pel on the current scan line. Recursive operation can be halted whenever the value of the feedback pel becomes identical to pel P.

As has now become evident, the feedback pel produced by the look up table forms part of the pel mask and, as such, varies the address that will subsequently be applied as input to the look-up table. This, in turn, affects the value of the successive filtered output pels that will be subsequently generated from the table. As noted, past values of the recursive feedback pel also form part of the pel mask.

As a result, operation of the inventive filter can be selectively and advantageously switched, depending upon the value of the feedback pel, between recursive and non-recursive to differentiate between weakly filtering the image, in order to preserve fine detail therein, and strongly filtering the image, in order to predominantly remove noise therefrom. For example, as discussed in greater detail below, the spatial filter is initially set to operate non-recursively in order to preserve fine detail. Thereafter, when a pre-defined noise pattern is detected, operation is switched from non-recursive to recursive to substantially remove this noise. Once this noise has been completely removed, operation is then switched back to non-recursive to again substantially preserve detail in the image. In this manner, portions of an image are filtered recursively to substantially remove noise therefrom while other portions of the same image are filtered non-recursively to substantially preserve image detail therein. Recursive operation advantageously allows the filter to remove noise that extends over a group of contiguous pels; while, non-recursive operation retains fine detail in the image.

Figure 4:
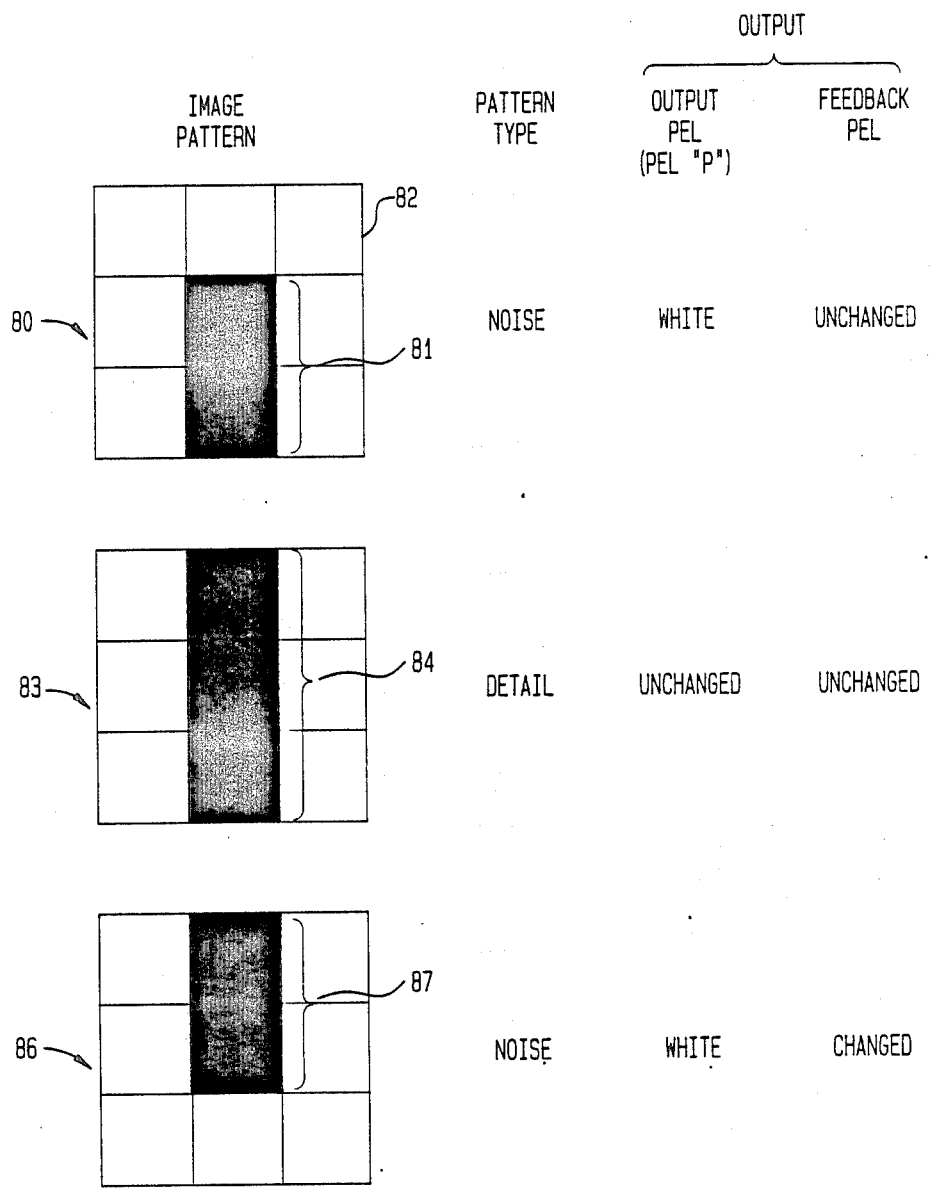
FIG. 4 depicts three illustrative pel patterns and the colors of the output and feedback pel values produced by the inventive spatial filter shown in FIG. 3 for each of these patterns.

To better appreciate the operation of the inventive spatial filter, consider the example shown in FIGS. 4 and 5. Specifically, FIG. 4 depicts various pel patterns and the colors of corresponding output and filtered pels for each of these patterns. Three pel patterns 80, 83 and 86 are shown. Two pel grouping 81 located within 3 by 3 pel mask 82 is initially considered to be a noise grouping. However, given this grouping, the filter is not certain whether pattern 80 is merely an isolated two pel noise grouping or the beginning of a detail grouping. Therefore, non-recursive operation is selected. As such, the color of the output filtered pel (pel P in the mask) is changed to white and the color of the feedback pel is left unchanged, i.e. black if that was its original color. Pattern 83 containing contiguous three pel grouping 84 corresponds to desired image detail. As such, the color of the output filtered pel is left unchanged, i.e. pel P remains at its original value—black, and the color of the feedback pel is also left unchanged. In contrast, pattern 86 containing two pel grouping 87 is viewed as noise which is to be recursively removed from the image. For this third pattern, the color of the output pel is changed, i.e. from black to white, and the color of the feedback pel is also changed, e.g. to white if black was its original color.

Figure 5B:
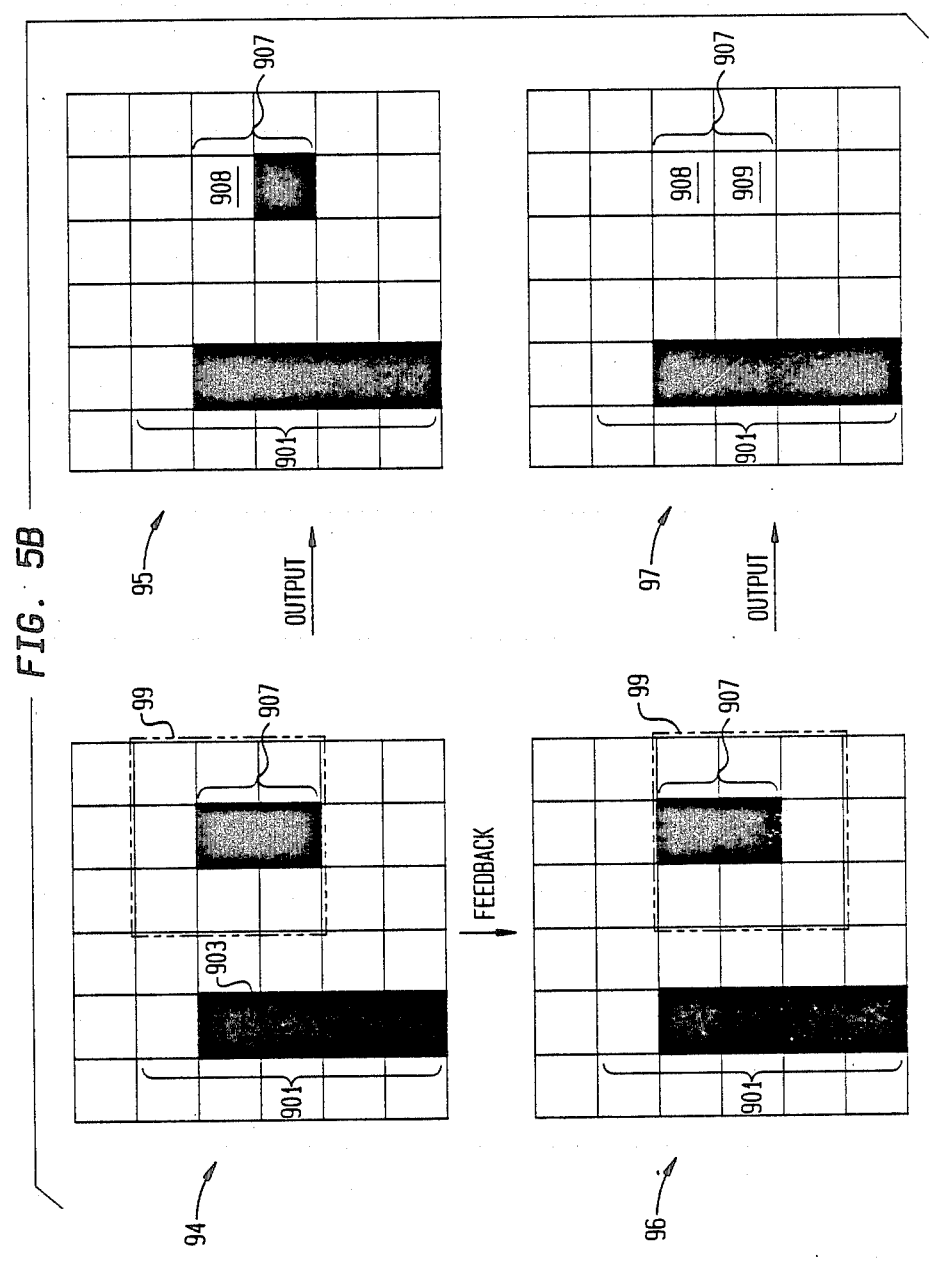

Now, given the pel patterns shown in FIG. 4, FIGS. 5a and 5b—for which the proper alignment of the drawing sheets is shown in FIG. 5—depict various output and feedback pels produced by the inventive spatial filter shown in FIG. 3 at various steps through an illustrative image as the filter progressively moves through this image. Appropriate references will be made to both FIGS. 4, 5a and 5b during the following discussion. Inasmuch as the pel mask only moves one pixel to the right at a time, most of the steps taken by the pel mask are not shown. Initially, pel mask 99 exists in the upper left hand corner of image 90. This image contains fine detail pattern 901, formed of individual contiguous pels 902, 903, 904, 905 and 906, and noise grouping 907, containing contiguous pels 908 and 909. Advantageously, as shown by the sequence in FIGS. 5a and 5b, the inventive filter completely removes noise grouping 907 from the image while preserving the vast majority of pels that form detail grouping 901.

In particular, the portion of image 90 contained within pel mask 99 is the same as that shown in pattern 80 in FIG. 4. For this pattern, the output filtered pel, i.e. the central pel in the mask, i.e. pel 902 in detail grouping 901, is changed to white. However, non-recursive operation is selected because the filter can not determine from the two black pel pattern located within the pel mask whether this grouping is isolated noise or the beginning of a detail grouping. Consequently, the feedback pel, also the central pel in the mask, is left unchanged. This results in image 92. For this image, the three black pel pattern contained within pel mask 99 corresponds to detail pattern 84 in FIG. 4. For this pattern, both the output filtered and feedback pels are left unchanged. As a result, pel 903 in output image 93 remains black. Likewise, the feedback pel, pel 903 within detail grouping 901, remains black as well. Now, as the pel mask moves through the the rest of detail grouping 901, the pel patterns will continue to resemble pattern 84. Hence, the filter having determined that this grouping is detail will not alter any of the remaining pels within detail grouping 901, as shown in final image 97. If, on the other hand, this pattern was identified as noise which is to be recursively removed, then the filter would continue to change pels within detail grouping 901 from black to white and thereby remove this grouping from the image.

Now, when pel mask 99 comes into the position shown in image 94, the pattern, here noise grouping 907, contained within located within the pel mask resembles pattern 80 shown in FIG. 4. For this pattern, the output pel produced by the filter, here pel 908, is changed to white as shown in image 95. The feedback pel, i.e. the central pel in mask 99 in image 94, is again left unchanged to yield image 96 because the filter can not yet determine whether this pattern is isolated noise or detail. Once pel mask 99 comes into the position shown in image 96, the pel pattern within the mask resembles pattern 86 shown in FIG. 4. As a result, the filter now identifies this pattern as noise which is to be recursively removed. Consequently, the output pel, pel 909 is changed to white and the feedback pel is also changed. As a result, noise grouping 907 has been completely removed from final image 97 by recursive operation of the filter. Alternatively, had this noise pattern been identified as detail, then only pel 908 would have been changed from black to white.

Through the use of the inventive filter, only a 3 by 3 pel mask is required to differentiate between a detail grouping and an isolated two pel noise grouping. A filter, such as that taught in the art, which is either purely recursive or non-recursive would disadvantageously require a 4 by 4 pel mask, an additional line store and 128 times the storage in the look up tables than that employed in the inventive filter to achieve this same result.

Figure 6C:
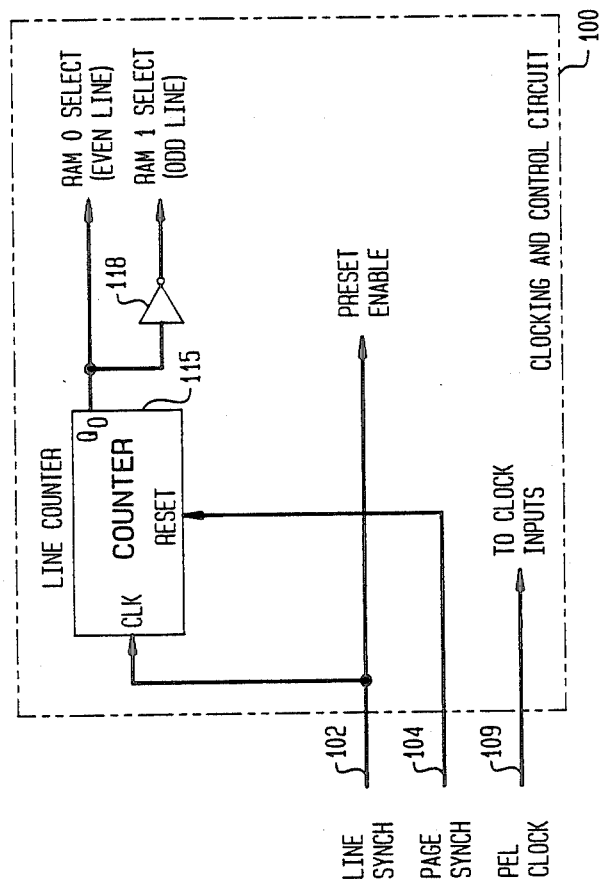
Figure 6:
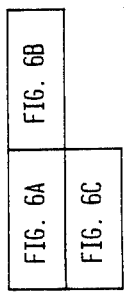
FIG. 6 shows the proper alignment of the drawing sheets for FIGS. 6a-6c.
Figure 6A:
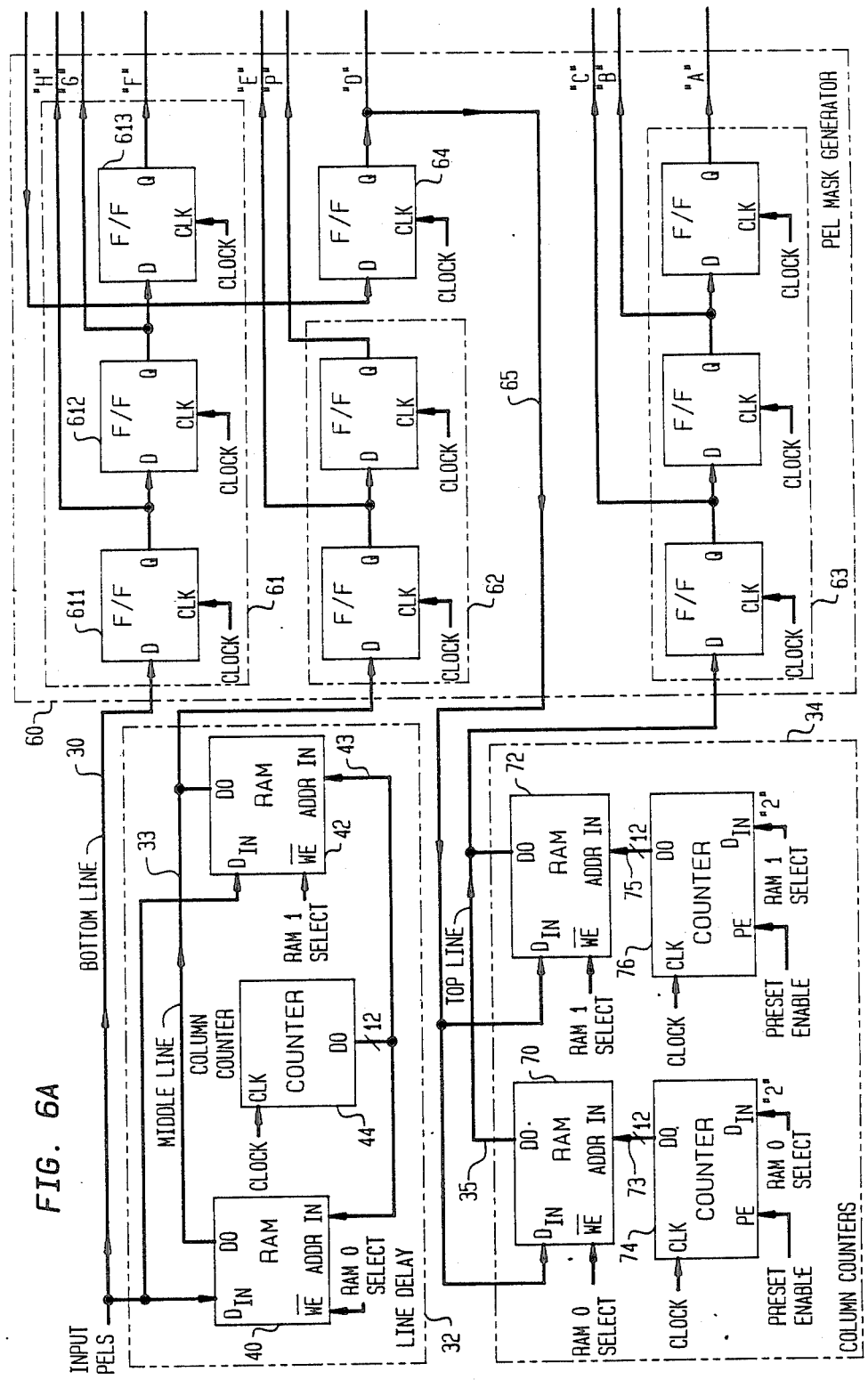

A detailed block diagram of the inventive spatial filter, shown in FIG. 3, is depicted in FIGS. 6a-6c, for which the proper alignment of the drawing sheets is shown in FIG. 6. To simplify the drawing, well-known chip select signals and associated control circuitry have been omitted from FIG. 4 but can be easily added by those skilled in the art.

As previously described, the spatial filter includes line delays 32 and 34, pel mask generator 60 and look up table 37 and, in addition, clocking and control circuit 100. Pel mask generator 60 consists of nine separate clocked D type flip/flops. Eight of these flip/flops from three separate shift registers: three bit shift registers 61 and 63 and two bit shift register 62. The remaining flip/flop is flip/flop 64 which stores the feedback pel provided by the look up table over feedback lead 39. The outputs of all these flip/flops are applied, as discussed previously, over address leads 36 to the address inputs of look up table 37. This look up table consists of two separate RAM memories, each of which is illustratively a 512 location by 1 bit static RAM. RAM 110 stores the feedback pel values; while RAM 111 stores the output filtered (non-recursive) pel values. The same address is applied over address leads 36 to both RAMs. When a noise pattern is applied as input to the look up tables and the filter is operating recursively, the output filtered pel produced by RAM 111 and the feedback pel produced by RAM 110 are both changed to the "noise free state". Alternatively, when a noise pattern is applied as input to the lookup tables and the filter is operating non-recursively, only the output filtered pel produced by RAM 111 is changed to "noise free state" and the feedback pel produced by RAM 110 remains at the same value as the corresponding pel (pel P) in the incoming image. Although look up table 37 is shown containing RAM circuits, read only memory (ROM) or programmable read only memory (PROM) can be used in lieu of RAM circuits. Alternatively, the determination of whether an input pel is noise or image detail can be made using an appropriate combinatorial logic circuit or an appropriately programmed array logic (PAL) circuit in lieu of the look up tables. Such a circuit would operate in response to the values of the pels that from the pel mask.

The data stored in each RAM can be changed by applying desired data to leads 120 and desired output filtered data to lead 121. In addition, suitable address information would also need to be applied in parallel to address leads 36 along with suitable chip select and write enable signals (both of which are well-known but not shown) to the desired RAM. In this manner, the characterisitics of the inventive spatial filter can be reaily altered to match changing image conditions.

Line delays 32 and 34 are implemented using RAM memories and counters. In particular, each line delay, such as line delay 32, contains two separate RAM memories: one to store an even line in the image and another to store an odd line in the image. If each scan line contains 4096 (4K) bi-level pels, then each RAM in the line delay is illustratively organized as 4K by 1 bit. These RAMs can be used for scan lines that contain less than 4K bi-level pels but must be increased in size to handle larger scan lines. In any event, to increase the processing speed of the filter, both RAM memories in each line delay operate on an interleaved basis: pel values from an even numbered scan line are sequentially written into one RAM memory, e.g. RAM 40, while pel values for an odd scan line are being sequentially read from the other RAM memory, e.g. RAM 42. Alternatively, if slow speed operation can be tolerated, then a single RAM memory which operates on a read-modify-write basis can be used within each line delay in lieu of two separate RAM memories. Control over each RAM in both line delays is provided through suitable select signals, as discussed in detail below, that are produced by clocking and control circuit 100 and are alternately applied to the write enable inputs of each RAM in each line delay. Within line delay 32, counter 44 counts each pel in a scan line in order to generate an appropriate address, via address leads 43, to RAM memories 40 and 42. This counter is incremented at the occurrence of each incoming pel by the application of a pel clock signal applied to pel clock lead 109. RAM memories 70 and 72, located within line delay 34, operate in the same manner as described above. Although a full scan line is being written into each RAM within line delay 34, the first two pels are not read out of RAMs 70 and 72 for each incoming scan line. For these RAMs, reading begins with the third pel in each scan line. Removing the first two pels is necessary if the filter is to synchronously operate with incoming pels. In particular, one pel clock cycle is required to access the feedback pel from RAM 110 located within look up table 37, and a second pel clock cycle is required to clock the recursive feedback pel into flip/flop 64. These operations necessitate that the first two pels be ignored. Since a full scan line is always alternately written into both RAMs 70 and 72, separate counters 74 and 76 are used to provide separate read and write addresses, over address leads 73 and 75, respectively.

At the beginning of each scan line during a read operation, and specifically at the occurrence of a horizontal synchronization (line sync) pulse appearing on line 102, one of the counters, i.e. that used for a subsequent read operation, within each line delay is loaded (preset) with the value "two". This is accomplished by applying high digital levels, via the select signals, to the parallel data in leads of that counter which together correspond to the value "two" and then, in response to the line sync pulse appearing on lead 102, applying a pulse to the preset enable (PE) input of the counter. At the same time, the line sync pulse causes the other counter, i.e.

that used for a subsequent write operation, in each line delay to be reset to zero. In addition, counter 115 located within clocking and control circuit 100 counts the line number of each scan line. As a result, the least significant bit of this counter toggles at the beginning of each successively occurring scan line. The output of this bit, $Q_0$, is applied as the RAM 0 (even line) select signal, and, through inverter 118, as the RAM 1 (odd line) select signal. This counter is reset at the beginning of each incoming image by the page sync signal appearing on input lead 104. The line sync signal appearing on input lead 102 provides the pre-set enable signal at the beginning of each scan line.

Clearly, those skilled in the art recognize that for multi-level images—i.e. images that contain colors or gray scale values, the value of each pel is multi-bit and represents the particular color or gray scale associated with that pel. Although the inventive apparatus has only been described in terms of apparatus that removes noise from bi-level images (black and white images), this apparatus can be readily extended to accommodate multi-level images by appropriately increasing the size of the look up table and registers, and storing additional empirically derived patterns within the table. In addition, the inventive filter can also be used to filter noise groupings having more than two contiguous pels. To do so, the pel mask could be appropriately expanded to, for example, a 3 by 4, a 4 by 4 size or an even larger size. In addition, the look up table would also be expanded as required. For example, for a 4 by 4 mask, each RAM would require 16 address lines, or 64K separate addressable locations. While such an enlarged filter would produce one output filtered pel at a time, multiple pels may be used as feedback pels. For example, for a 4 by 4 pel mask, the four central pels in the mask may all be recursively fed back to occupy appropriate positions in an input pel mask. Alternatively, for a 3 high by 4 wide pel mask, the two central pels may be recursively fed back. As the mask size increases, so does the number of feedback pels.

In addition, several look up tables can be incorporated into the inventive spatial filter. Each look up table would store a different set of patterns. The particular table that would be used would depend upon pre-defined characteristics of the images. For example, one table might be specifically applicable for filtering textual images containing certain character sets; another filter might be useful for images containing other character sets; while a third table might be useful for graphical or non-textual images. The particular table to be used can be selected by a user, through an appropriate switch, or by equipment situated downstream of the spatial filter, e.g. by suitable motion detectors or other picture processing systems, given certain characteristics of the filtered image. One of those characteristics might be the percentage of black to white pels that form the image. If the image appears too dark, e.g. 40% black, then a different table can be selected to bring subsequent filtered images closer to a normal range, such as 80% white for textual images. Alternatively, if the image is to be transmitted, then the selected table might be one which maximizes run length (i.e. the number of pels of the same color) in order to adequately compress the images. Separate selectable tables for the recursive feedback pels and other selectable tables for the filtered output pels can also be employed if needed.

Although a specific illustrative embodiment has been shown and described herein, this merely illustrates the teachings of the present invention. Clearly, many varied arrangements may be devised by those skilled in the art without departing from the spirit and scope of the invention.

I claim:

1. Apparatus for a spatial filter which provides an output filtered pel value for a corresponding input pel in an incoming video image, said apparatus comprising:
    means, responsive to pel values that form the incoming image, for producing a pel mask associated with said input pel, said pel mask defining an array of pels including said input pel wherein each of said pels in said mask has a corresponding pel value;
    means, responsive to the values of said pels that form said pel mask, for determining whether said input pel is a noise pel or an image pel and, in response thereto, for producing one of a pre-defined plurality of filtered pel values and a corresponding one of a pre-defined plurality of feedback pel values;
    means for applying said produced filtered pel value as said output filtered pel value;
    means for applying said produced feedback pel value from said determining means to said pel mask producing means such that said produced feedback pel value becomes one of the pel values for the pels that form the pel mask for a subsequently occurring input pel and wherein the value of said produced feedback pel determines whether said filter operates recursively or non-recursively.

2. The apparatus in claim 1 wherein said determining and producing means comprises a look up table for storing said pre-defined plurality of filtered pel values and said pre-defined plurality of feedback pel values.

3. The apparatus in claim 2 further comprising means for selectively halting recursive operation of said filter by setting the value of said produced feedback pel equal to the value of a corresponding pel in said incoming image.

4. The apparatus in claim 3 wherein said pel mask producing means comprises means for temporarily storing values of pels that together form said pel mask, wherein said stored values include respective values of a plurality of said incoming pels and at least one previously produced feedback pel value.

5. The apparatus in claim 4 wherein said pel mask producing means further comprises:
    first means for applying at least one of the values of the pels that form a bottom line of said pel mask to a respective address lead of said look up table;
    first means for delaying said incoming pel values by a line in order to produce values of pels that will occupy a middle line of said pel mask;
    second means for applying the values of at least one of said middle line pel values to respective address leads of said look up table;
    third means for applying said feedback pel value to a respective address lead of said determining means;
    second means for delaying each feedback pel value by a line in order to produce values of pels that will occupy a top line of said pel mask; and
    fourth means for applying the values of least one of said pels in said top line to a respective address lead of said look up table.

6. The apparatus in claim 5 wherein said look up table comprises at least two memory sections, one of said sections for storing said feedback pel values and the other section for storing said filtered pel values.

7. The apparatus in claim 6 wherein said first, second and fourth means are shift registers.

8. The apparatus in claim 7 wherein said first and second delaying means each comprise two memories, one of said memories for storing pel values associated with even scan lines in said image and the other memory for storing pel values associated with odd scan lines in said image, wherein one of said memories performs a read operation while the other performs a write operation.

9. Apparatus for a spatial filter which provides an output filtered pel value for a corresponding input pel in an incoming video image, said apparatus comprising:
- means, responsive to the pel values that form the incoming image, for producing a pel mask associated with said input pel, said pel mask defining an array of pels including said input pel wherein each of said pels in said mask has a corresponding pel value and wherein the pels that together form said pel mask include respective values of a plurality fo the incoming pels and at least one previously produced feedback pel value;
- means for storing pre-defined filtered pel values and pre-defined feedback pel values;
- means for applying the values of said pels that form said pel mask as an address to the storing means to produce one of said filtered pel values and a corresponding one of said pre-defined feedback pel values;
- means for applying said produced pre-defined filtered pel value as the output filtered pel value;
- means for applying said produced pre-defined feedback pel value from said storing means as said feedback pel value to said pel mask producing means such that said produced feedback pel value becomes one one of the pel values for the pels that form the pel mask for a subsequently occurring input pel and wherein the value of said produced feedback pel determines whether said filter operates recursively or non-recursively.

10. The apparatus in claim 9 wherein said storing means comprises a look up table.

11. The apparatus in claim 10 wherein said pel mask producing means further comprises:
- first means for serially accepting incoming pel values as said bottom line of pels in said mask and for applying at least one of the values of the pels in said bottom line to a respective address lead of said storage means;
- first means for delaying said incoming pel values by a line in order to produce values of pels that will occupy a middle line of said pel mask;
- second means for serially accepting said middle line pels produced by said first delaying means and for applying the values of at least one of said middle line pel values to respective address leads of said look up table;
- first means for temporarily storing said feedback pel value and for applying said feedback pel value to a respective address lead of said look up table;
- second means for delaying each feedback pel value stored within said first temporary storing means by a line in order to produce values of pels that will occupy a top line of said pel mask; and
- third means for serially accepting said top line pels produced by said second delaying means and for applying the values of least one of said pels in said top line to a respective address lead of said look up table.

12. A method for use in a spatial filter for providing an output filtered pel value for a corresponding input pel in an incoming video image, said method comprising the steps of:
- producing, in response to the pel values that form the incoming image, a pel mask associated with said input pel, said pel mask defining an array of pels including said input pel wherein each of said pels in said mask has a corresponping pel value;
- determining, in response to the values of said pels that form said pel mask, whether said input pel is a noise pel or an image pel and, in response thereto, producing one of a pre-defined plurality of filtered pel values and a corresponding one of a pre-defined plurality of feedback pel values, wherein the value of said produced feedback pel determines whether said filter operates recursively or non-recursively;
- storing in memory, said pre-defined filtered pel values and said pre-defined feedback pel values;
- applying said produced filtered pel value from memory as said output filtered pel value; and
- applying said produced feedback pel value from memory to said pel mask producing step such that said produced feedback pel value becomes one of the pel values for the pels that form the pel mask for a subsequently occurring input pel.

13. The method in claim 12 wherein said pel mask producing step includes the step of temporarily storing values of pels that together form said pel mask, wherein said stored values include respective values of a plurality of said incoming pels and at least one previously produced feedback pel value.

14. The method in claim 13 wherein said pel mask producing step further comprises the steps of:
- applying at least one of the values of the pels that form a bottom line of said pel mask as a first portion of an address to memory;
- delaying said incoming pel values by a line in order to produce values of pels that will occupy a middle line of said pel mask;
- applying the values of at least one of said middle line pel values as a second portion of the address to memory;
- applying said feedback pel value to a respective address to said storage means;
- applying each feedback pel value by a line in order to produce values of pels that will occupy a top line of said pel mask; and
- applying the values of least one of said pels in said top line as a third portion of the address to memory.

* * * * *